(12) United States Patent
Williams (10) Patent No.: US 11,091,012 B2
(45) Date of Patent: Aug. 17, 2021

(54) AUTOMOTIVE DOOR IMPACT PROTECTION BEAM CATCH TAB

(71) Applicant: TOYOTA MOTOR ENGINEERING & MANUFACTURING NORTH AMERICA, INC., Plano, TX (US)

(72) Inventor: Paxton S. Williams, Milan, MI (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 67 days.

(21) Appl. No.: 16/710,347

(22) Filed: Dec. 11, 2019

(65) Prior Publication Data
US 2021/0178868 A1  Jun. 17, 2021

(51) Int. Cl.
*B60J 5/04* (2006.01)
(52) U.S. Cl.
CPC .......... *B60J 5/0458* (2013.01); *B60J 5/0422* (2013.01); *B60J 5/0425* (2013.01)
(58) Field of Classification Search
CPC ........ B60J 5/042; B60J 5/0422; B60J 5/0458; B60J 5/0425
USPC ...................................... 296/146.6
See application file for complete search history.

(56) References Cited

U.S. PATENT DOCUMENTS

| | | | |
|---|---|---|---|
| 3,788,686 A | 1/1974 | Rossie et al. | |
| 5,518,290 A | 5/1996 | Reinhard et al. | |
| 5,599,057 A * | 2/1997 | Hirahara | B60J 5/0437 296/146.6 |
| 5,895,088 A | 4/1999 | Knott | |
| 7,530,624 B2 * | 5/2009 | Endo | B60J 5/0426 296/146.6 |
| 8,882,180 B2 | 11/2014 | van Oirschot | |
| 8,973,971 B1 * | 3/2015 | Henke | B60J 5/0444 296/146.6 |
| 9,475,366 B2 | 10/2016 | Faruque et al. | |
| 2014/0375078 A1 * | 12/2014 | Fujihara | B60J 5/0443 296/146.6 |

FOREIGN PATENT DOCUMENTS

| | | |
|---|---|---|
| DE | 10261638 A1 | 7/2004 |
| KR | 1020070064483 A | 6/2007 |

* cited by examiner

*Primary Examiner* — Joseph D. Pape
(74) *Attorney, Agent, or Firm* — Haynes and Boone, LLP (57) ABSTRACT

Disclosed is a retention system for an automotive door impact protection beam. The system comprises a bracket coupled to a door panel of a vehicle, the bracket comprising an aperture, and an impact protection beam coupled to the bracket and positioned adjacent to the door panel of the vehicle. The system further comprises a longitudinal primary face that includes a longitudinally extending mast comprising a stiffening bead and a hook end, wherein the mast extends through the aperture of the bracket, a first coupling shoulder coupled to the door panel, a shelf projecting laterally from a top edge of the primary face, a longitudinal secondary face projecting from an edge of the shelf; and a second coupling shoulder coupled to the door panel. The shelf includes an opening that is longer and wider than the mast.

19 Claims, 7 Drawing Sheets

AUTOMOTIVE DOOR IMPACT PROTECTION BEAM CATCH TAB

TECHNICAL FIELD

The subject matter described herein relates to a device for mitigating damage in an automobile crash. This impact protection beam catch tab has particular but not exclusive utility for reducing side impact damage in cars and trucks.

BACKGROUND

Impact protection beams are used in automobile doors for crash mitigation. During a side impact event, a door (and therefore an impact protection beam positioned within the door) may be struck by a barrier, bumper, fender, or other object. In such a collision, the door impact protection beam is likely to bend. Since the door impact protection beam is typically connected to a door inner panel by spot welds, such bending places high loading on the welds, possibly breaking them. In other cases, the welds may remain intact while the door inner panel tears. In either case, the load holding capacity of the door impact beam is compromised by such a failure. If the door impact beam can't continue to hold the load from the impacting object, then the passenger can receive a high load impact from the door, potentially causing injury. Accordingly, a need exists for improved door impact protection beams that address the forgoing and other concerns.

The information included in this Background section of the specification, including any references cited herein and any description or discussion thereof, is included for technical reference purposes only and is not to be regarded as limiting.

SUMMARY

Disclosed is an impact protection beam catch tab. The impact protection beam catch tab disclosed herein has particular, but not exclusive, utility for mitigating side impact crashes in cars and trucks. One general aspect of the impact protection beam catch tab includes a retention device for an automotive door impact protection beam, including: a longitudinal primary face that includes a longitudinally extending mast including a stiffening bead and a hook end, the mast having a width and a length; a first coupling shoulder projecting laterally from a bottom edge of the primary face; a shelf projecting laterally from a top edge of the primary face, the shelf including an opening, the opening having a width sized greater than or equal to the width of the mast and a length sized greater than or equal to the length of the mast; a longitudinal secondary face projecting from an edge of the shelf; and a second coupling shoulder projecting laterally from a top edge of the secondary face.

Implementations may include one or more of the following features. The retention device further including two slots or notches in the top edge of the primary face, to the left and right of the mast respectively. The retention device where the mast and hook end are positioned through an aperture of a bracket, where the bracket is coupled to a door panel of a vehicle. The retention device where the bracket is coupled to an impact protection beam positioned adjacent to the door panel of the vehicle. The retention device further including the bracket and the impact protection beam. The retention device where the hook end projects from the mast at an angle of between 10 degrees and 90 degrees. The retention device where the mast projects from and is parallel to the longitudinal primary face. The retention device where: the hook end projects from the longitudinal primary face at an angle of about 45 degrees, the first coupling shoulder projects laterally from the bottom edge of the primary face at an angle of about 90 degrees, the shelf projecting laterally from a top edge of the primary face at an angle of about 90 degrees, the longitudinal secondary face projecting from the edge of the shelf at an angle of about 90 degrees, and the second coupling shoulder projects laterally from the top edge of the secondary face at an angle of about 90 degrees. The retention device where: a length of the first coupling shoulder and second coupling shoulder is between 0.5 cm and 2.5 cm, a length of the secondary face is between 1.0 cm and 3.0 cm, a length of the shelf is between 2.0 cm and 4.0 cm, the length of the mast is between 2.0 cm and 4.0 cm, a length of the hook end is between 0.4 cm and 1.0 cm, and a length of the primary face is between 2.0 cm and 5.0 cm.

One general aspect includes a retention system for an automotive door impact protection beam, including: a bracket coupled to a door panel of a vehicle, the bracket including an aperture; an impact protection beam coupled to the bracket and positioned adjacent to the door panel of the vehicle; a longitudinal primary face that includes a longitudinally extending mast including a stiffening bead and a hook end, the mast having a width and a length, where the mast extends through the aperture of the bracket; a first coupling shoulder coupled to the door panel and projecting laterally from a bottom edge of the primary face; a shelf projecting laterally from a top edge of the primary face, the shelf including an opening, the opening having a width sized greater than or equal to the width of the mast and a length sized greater than or equal to the length of the mast; a longitudinal secondary face projecting from an edge of the shelf; and a second coupling shoulder coupled to the door panel and projecting laterally from a top edge of the secondary face.

Implementations may include one or more of the following features. The retention system further including two slots or notches in the top edge of the primary face to the left and right of the mast. The retention system where the hook end projects from the mast at an angle of between 10 degrees and 90 degrees. The retention system where the mast projects from and is parallel to the longitudinal primary face. The retention system where: the hook end projects from the longitudinal primary face at an angle of about 45 degrees, the first coupling shoulder projects laterally from the bottom edge of the primary face at an angle of about 90 degrees, the shelf projecting laterally from a top edge of the primary face at an angle of about 90 degrees, the longitudinal secondary face projecting from the edge of the shelf at an angle of about 90 degrees, and the second coupling shoulder projects laterally from the top edge of the secondary face at an angle of about 90 degrees. The retention system where: a length of the first coupling shoulder and second coupling shoulder is between 0.5 cm and 2.5 cm, a length of the secondary face is between 1.0 cm and 3.0 cm, a length of the shelf is between 2.0 cm and 4.0 cm, the length of the mast is between 1.0 cm and 4.0 cm, a length of the hook end is between 0.4 cm and 1.0 cm, and a length of the primary face is between 2.0 cm and 5.0 cm.

One general aspect includes a method for retaining an impact protection beam within a vehicle door, the method including: positioning the impact protection beam adjacent to a door panel of the vehicle door; coupling the impact protection beam to a bracket, the bracket including an aperture; coupling the bracket to the door panel of the vehicle door; providing an impact protection beam catch tab having both a catch tab body and a catch tab mast, the catch tab mast including a hook end; positioning the hook end and a portion of the catch tab mast through the aperture of the bracket; and coupling the catch tab body to the door panel of the vehicle door.

Implementations may include one or more of the following features. The method where the portion of the catch tab mast projecting through the aperture has a length of between about 1.0 centimeters and about 4.0 centimeters. The method where a length of the hook end is between 0.4 cm and 1.0 cm. The method where the hook end projects from the catch tab mast at an angle of between 10 degrees and 90 degrees.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the impact protection beam catch tab, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which.

DETAILED DESCRIPTION

During a vehicle side impact event, a vehicle door impact protection beam may be struck by an external object such as a barrier, wheel, bumper, fender, or the door of another vehicle. In such a collision, the door impact protection beam is likely to experience forces that cause it to bend or deform. Since the door impact beam may be connected to a door inner panel by spot welds (e.g., on a bracket designed to hold the impact protection beam in place), such bending places high loading on the welds, possibly breaking them. In other cases, the welds (or other connection points) may remain intact while the door inner panel tears. In either case, the door impact beam becomes detached from the door panels, and is free to translate and/or rotate within the vehicle door, such that the load holding capacity of the door impact protection beam, and therefore the overall vehicle door structure, is compromised. If the door impact protection beam cannot continue to absorb, deflect, redirect, or dissipate the impact forces imparted by the external object, then the deformation of the overall side door structure may be significant. This can result in parts of the door structure entering the passenger cabin and imparting high loads on the passenger, potentially causing serious injury. Accordingly, the present disclosure provides for improved door impact protection beams that are capable of withstanding greater forces, or of withstanding forces for a longer period of time, during a side impact crash event.

The present disclosure provides for additional retention features to hold an impact protection beam in place in the case of a failure of the welds that connect it to the door panel. For example, the present disclosure provides a hooking feature between the impact beam end reinforcement and another member, to serve as a retention device that helps capture and hold the connection area together and distribute the impact loads, thus preventing or delaying any tearing of the welds or panels. This added retention feature improves the ability of the side door impact protection beam to absorb, deflect, redirect, or dissipate impact energy and forces caused by a side impact crash event.

The impact protection beam catch tab aids substantially in crash impact damage mitigation and passenger injury mitigation, by improving the ability of an impact protection beam to remain in its desired position within a vehicle door. This improved or augmented retention system transforms a standard impact protection beam into a fail-soft device with intermediate modes between normal function and total failure, without the normally routine need to add additional impact protection beams to achieve a similar result. This unconventional approach improves the functioning of the vehicle door during side impact crash events, by increasing the total amount of impact energy the door can absorb, deflect, redirect, or dissipate, and/or increasing the span of time over which the door can absorb, deflect, redirect, or dissipate impact energy before vehicle passengers are affected.

These descriptions are provided for exemplary purposes only, and should not be considered to limit the scope of the impact protection beam catch tab. Certain features may be added, removed, or modified without departing from the spirit of the claimed subject matter.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

Figure 1:
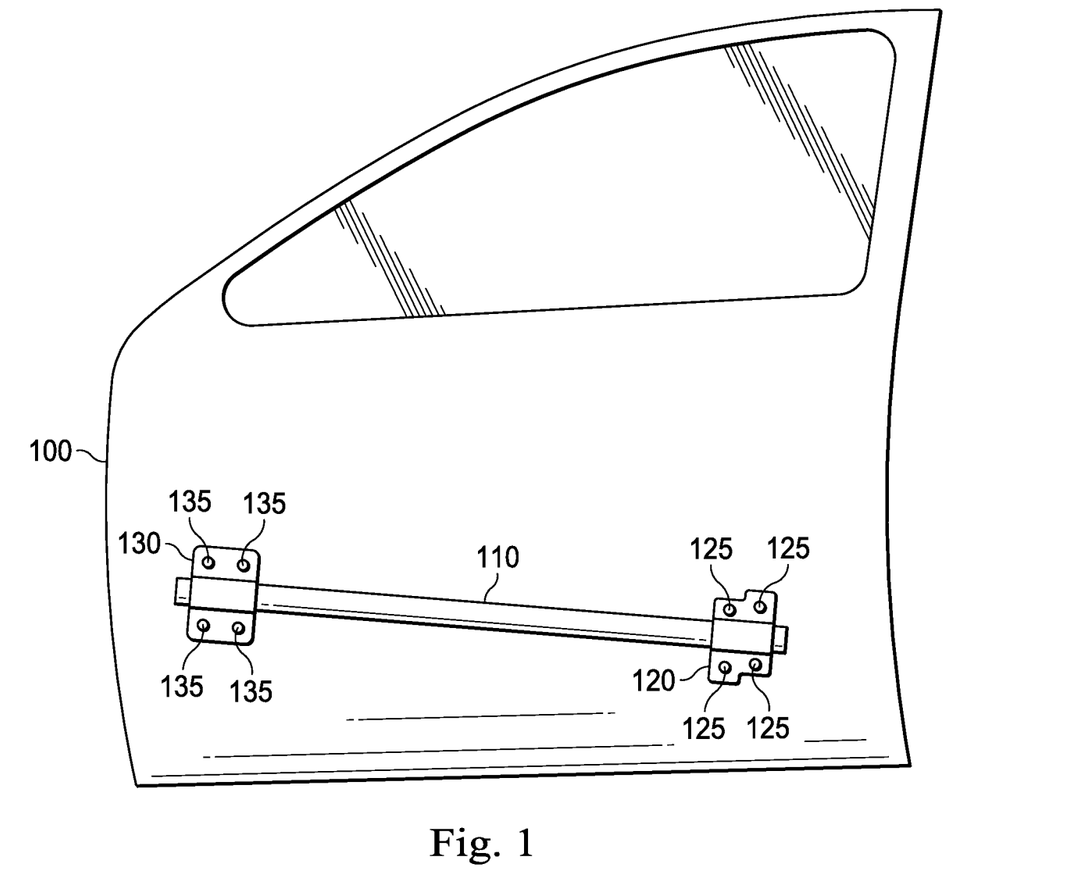
FIG. 1 is a diagrammatic representation of an exemplary, impact protection beam in accordance with at least one embodiment of the present disclosure.

FIG. 1 is a diagrammatic representation of an exemplary, impact protection beam 110 in accordance with aspects of the present disclosure. In this example, the impact protection beam 110 is supported by a rear bracket 120 that is coupled to the door panel 100 by a plurality of attachment points 125. The impact protection beam 110 is further supported by a forward bracket 130, which is coupled to the door panel 100 by a plurality of attachment points 135. With impact protection beam 110, no retention mechanism is provided to hold the impact protection beam 110 in place in the case where the attachment points 135 have failed. Therefore, in a side impact scenario, if the attachment points 125 and/or the attachment points 135 break loose, the impact protection beam 110 will be decoupled from the door panel 100, and will be free to translate or rotate within the vehicle door. Thus, the ability of the impact protection beam 110 to absorb, deflect, redirect, or dissipate crash energy will be severely compromised. The present disclosure provides a solution to this problem.

Before continuing, it should be noted that the examples described above are provided for purposes of illustration, and are not intended to be limiting. Other devices and/or device configurations may be utilized to carry out the operations described herein.

Figure 2:
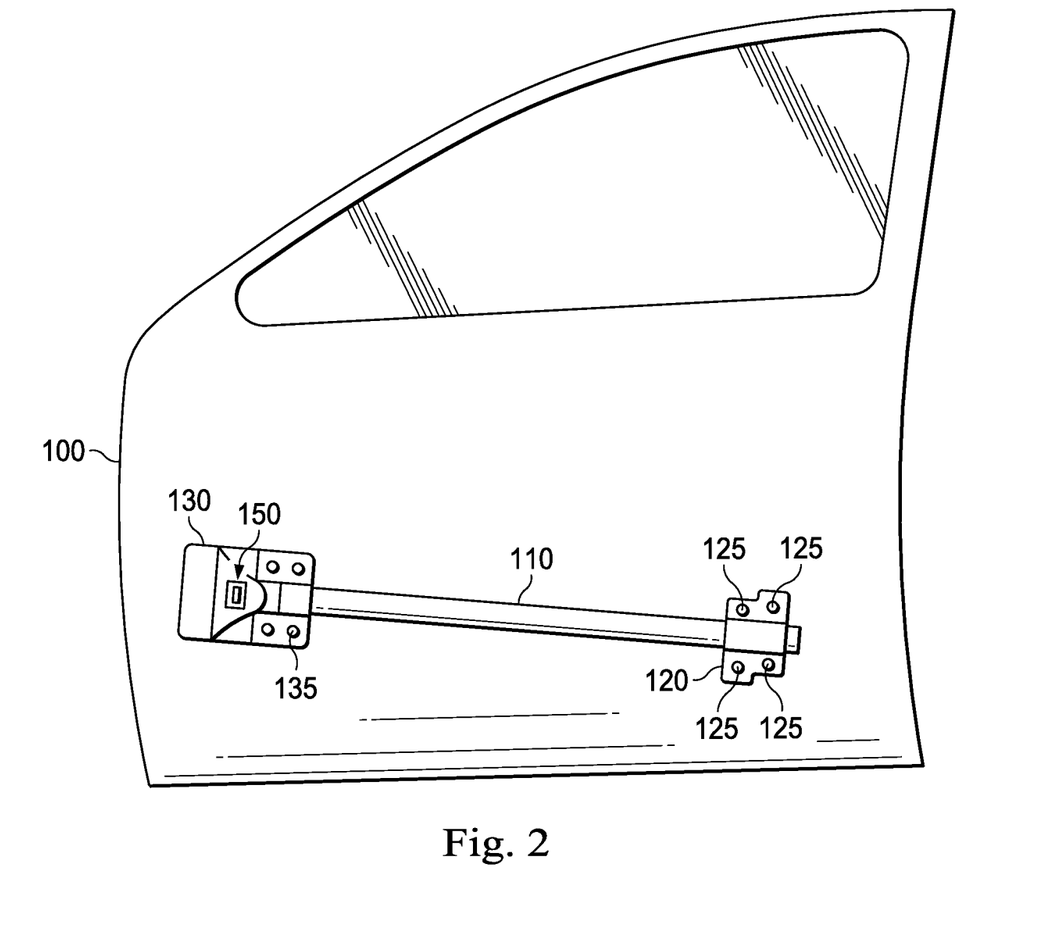
FIG. 2 is a diagrammatic representation of an exemplary impact protection beam catch tab in accordance with at least one embodiment of the present disclosure.

FIG. 2 is a diagrammatic representation of an exemplary impact protection beam catch tab 150 in accordance with at least one embodiment of the present disclosure. Visible are an exemplary door panel 100 and impact protection beam 110. In this example, the impact protection beam 110 is supported by a rear bracket 120 that is coupled to the door panel 100 by a plurality of attachment points 125. The impact protection beam 110 is further supported by a forward bracket 130, which is coupled to the door panel 100 by a plurality of attachment points 135. In an example, the attachment points are welds, screws, bolts, or pins, although other types of attachment point may be employed instead or in addition to these.

In this embodiment, the forward bracket 130 is further coupled to the door panel 100 by a catch tab 150. In a side impact, the catch tab helps take stress off of the attachment points 135, and also provides some retention for the forward bracket 130 and the impact protection beam 110 if the attachment points 135 break loose during the impact. Although the catch tab 150 is shown securing the forward bracket 130, it should be understood that a catch tab 150 can also be provided at the rear bracket 120 instead of, or in addition to, the catch tab 150 on the forward bracket 130.

In an example, to help protect against a partially or directly lateral impact, the impact protection beam 110 is disposed on or within the door panel 100 in a substantially horizontal orientation, and the catch tab 150 is sized, shaped, and oriented for the retention of a substantially horizontal impact protection beam 110.

Figure 3:
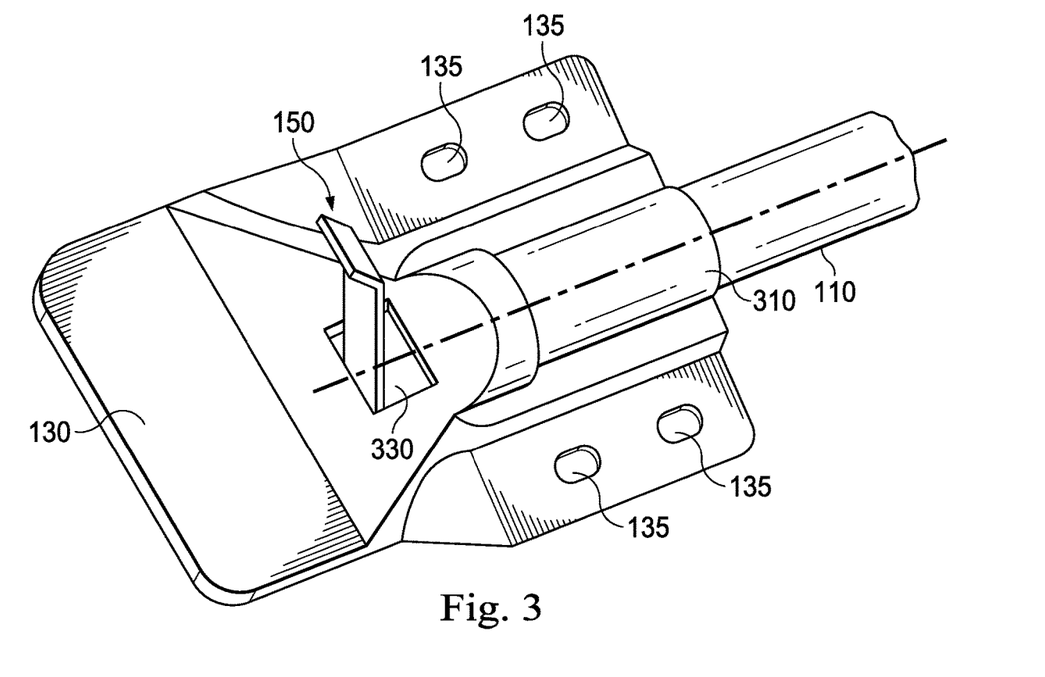
FIG. 3 is a diagrammatic, perspective view of an exemplary impact protection beam catch tab in accordance with at least one embodiment of the present disclosure.

FIG. 3 is a diagrammatic, perspective view of an exemplary impact protection beam catch tab 150 in accordance with at least one embodiment of the present disclosure. Visible are the impact protection beam 110, forward bracket 130, and attachment points 135. Also visible is an example catch tab 150 projecting through an aperture 330 in the forward bracket 130 that is sized and shaped to receive the catch tab 150. The impact protection beam is held in place by an impact protection beam sleeve 310 in the forward bracket 130.

Figure 4:
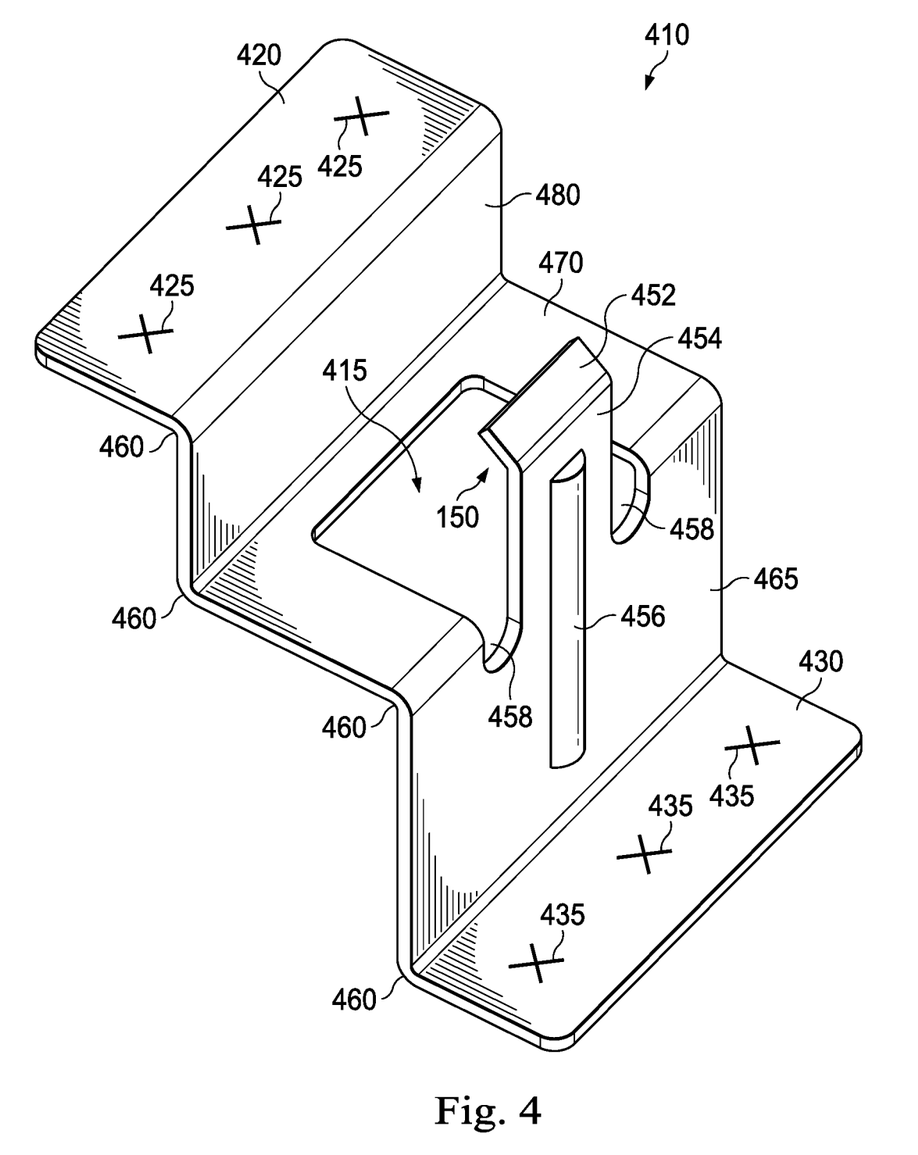
FIG. 4 is a diagrammatic, perspective view of an example impact protection beam catch tab in accordance with at least one embodiment of the present disclosure.

FIG. 4 is a diagrammatic, perspective view of an example impact protection beam catch tab 150 in accordance with at least one embodiment of the present disclosure. In this exemplary embodiment, the catch tab 150 is part of a catch tab body 410 that also includes a forward coupling shoulder 420 and rear coupling shoulder 430, by which the catch tab body 410 may be attached to the door panel (e.g., door panel 100 of FIG. 1) by means of attachment points 425 and 435, respectively.

In the example shown in FIG. 4, the catch tab 150 includes a hook end 452, a catch tab mast 454, and a stiffening bead 456 for added strength and stiffness. The catch tab body 410 includes an opening 415 for weight reduction, and two slots or notches 458 (resulting from the process of cutting the catch tab mast 454 out of a metal blank, as described below in FIG. 7). The catch tab 150 further includes bends 460 (e.g., five bends) forming a step configuration. In an example, all of the bends 460 except the one forming the hook end 452 are 90-degree bends, although other values may be employed for one or more of the bends 460, such as 30 degrees, 45 degrees, 120 degrees, or other values both larger and smaller. In an example, the bend 460 forming the hook end 452 is a 45-degree bend, although other values larger or smaller may be used (e.g., between 10 degrees and 90 degrees). The catch tab body 410 provides a step configuration that includes not only the forward coupling shoulder 420 and rear coupling shoulder 430, but also a primary face 465, a shelf 470, and a secondary face 480 offset from the primary face. In an example, the forward coupling shoulder 420 and rear coupling shoulder 420 are between 0.5 cm and 2.5 cm long, the secondary face is between 1.0 cm and 3.0 cm tall, the shelf 470 is between 2.0 cm and 4.0 cm long, the mast 454 projects between 1.0 cm and 4.0 cm above the shelf 470, the hook end is between 0.4 cm and 1.0 cm long, and the primary face 465 is between 2.0 cm and 5.0 cm tall, although other dimensions both larger and smaller may be employed without departing from the spirit of the present disclosure.

In an example, the catch tab body 410, including the catch tab 150, forward coupling shoulder 420, rear coupling shoulder 430, primary face 465, mast 454, hook end 452, shelf 470, secondary face 480, stiffening bead 456, and bends 460 may be produced by stamping a metal blank (e.g., a rectangular metal blank).

Figure 5:
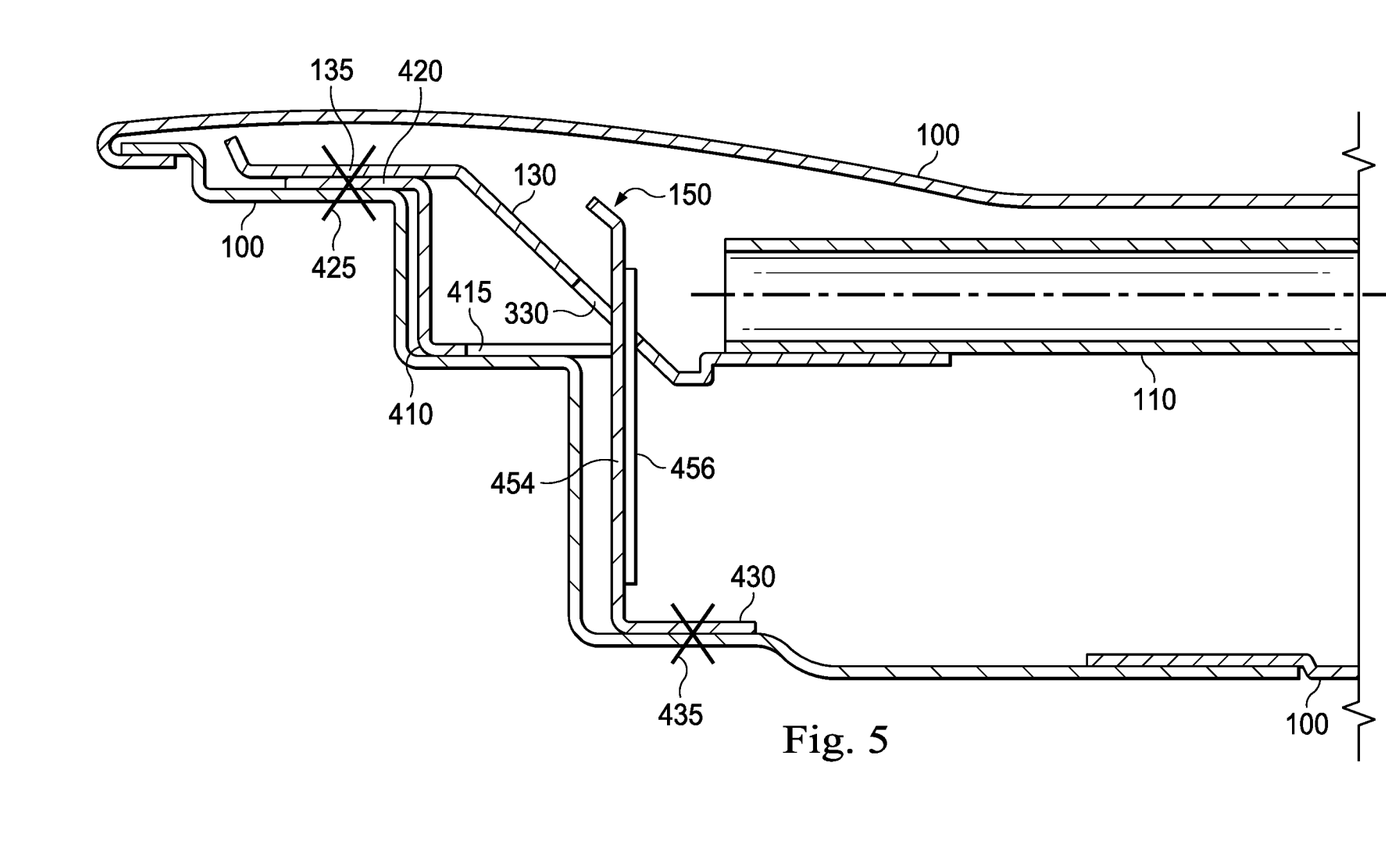
FIG. 5 is a diagrammatic cutaway view of an example impact protection beam catch tab within a vehicle door comprising several door panels, in accordance with at least one embodiment of the present disclosure.

FIG. 5 is a diagrammatic cutaway view of an example impact protection beam catch tab 150 within a vehicle door comprising several door panels 100, in accordance with at least one embodiment of the present disclosure. Visible are the door panel impact protection beam 110, forward bracket 130, catch tab 150, aperture 330, catch tab body 410, opening 415, catch tab forward coupling shoulder 420, catch tab rear coupling shoulder 430, catch tab mast 454, and stiffening bead 456. The catch tab 150 is held in place by the welds or other attachment points 425 and 435 that secure the catch tab body 410 to the door panel 100. The forward bracket 130 is held in place by the welds or other attachment points 135 that secure the forward bracket 130 to the door panel 100, and in some embodiments to the catch tab body 110 as well. The door impact protection beam 110 may be held in place by an impact protection sleeve 310 as shown in FIG. 3, or may alternatively be secured to the forward bracket by welds, solder, screws, bolts, pins, rivets, clamps, or other means.

The catch tab 150 projects through the aperture 330 in the forward bracket 130. If the attachment points 135 that secure the forward bracket 130 to the door panel 100 are broken in an impact, such that the forward bracket 130 is no longer secured to the door panel 100, the catch tab 150 projecting through the aperture 330 will provide some retention. In this case, without the catch tab 150, any bending of the door impact protection beam 110 due to crash impact forces would normally cause unsecured movement of the forward bracket 130. However, with the catch tab 150 projecting through the aperture 330 in the forward bracket 130, any movement of the forward bracket 130 may be partially arrested by the catch tab 150, such that the door impact protection beam 110 stays in place for a longer period of time during the crash, and continues during that added time to be able to absorb, redirect, and dissipate a portion of the crash energy imparted by the impact. Furthermore, in some embodiments, a certain amount of crash force or energy may be transferred into bending the catch tab 150 rather than being distributed directly into the door panel 100.

Figure 6:
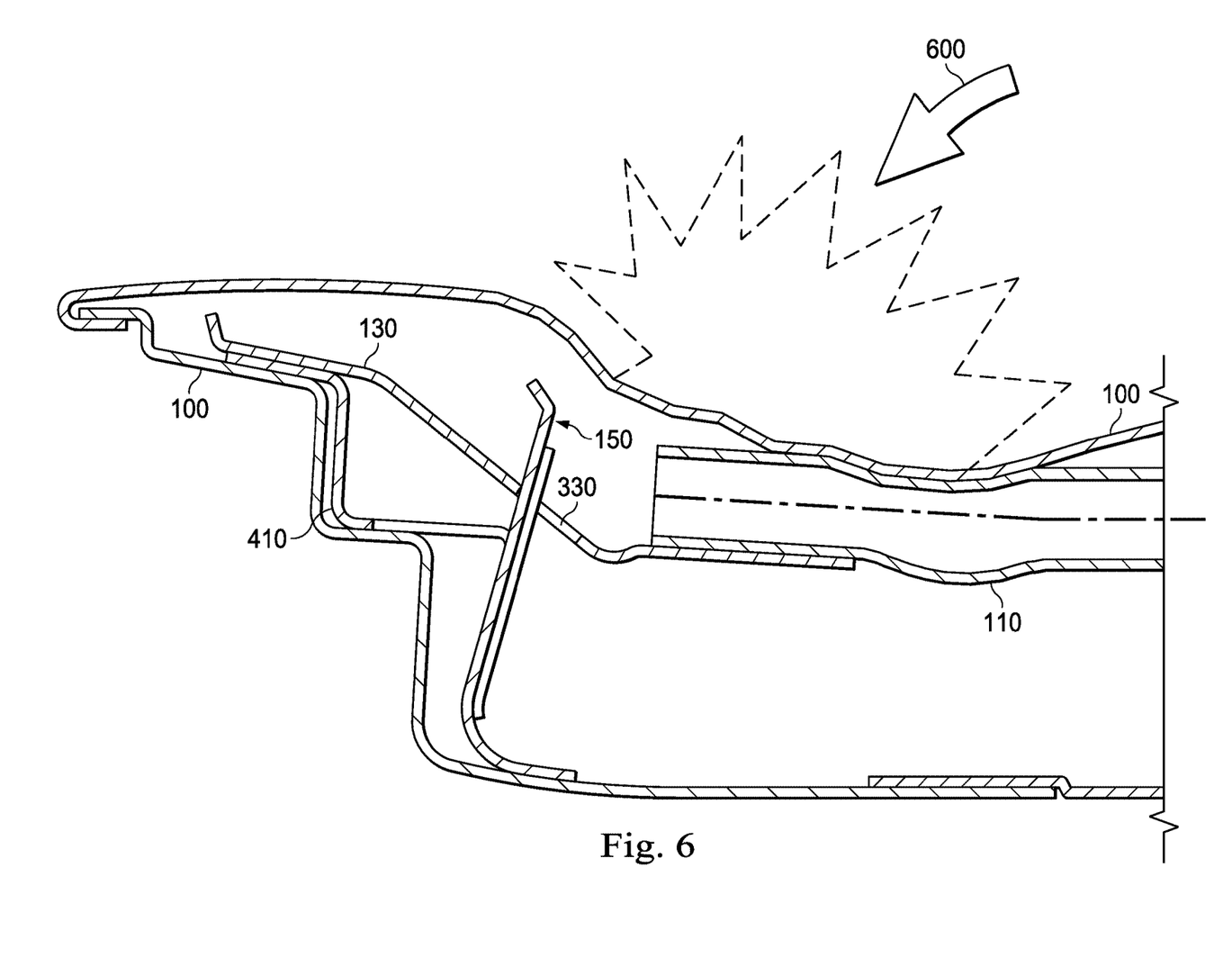
FIG. 6 is a diagrammatic cutaway view of an example impact protection beam catch tab during a side impact crash event, in accordance with at least one embodiment of the present disclosure.

FIG. 6 is a diagrammatic cutaway view of an example impact protection beam catch tab 150 during a side impact crash event, in accordance with at least one embodiment of the present disclosure. In this example, the impact protection beam catch tab 150 prevents the impact protection beam 110 from displacing during the side impact crash event. During the impact, an impact force 600 causes inward deformation of a door panel 100, which then contacts and deforms the door impact protection beam 110, causing it to bend inward as well. With sufficient force 600, the resulting deformation will break loose the attachment points holding the forward bracket in place. Under normal circumstances, this breaking loose would cause the door impact protection beam 110 to displace freely within the vehicle's side door, sharply limiting its ability to absorb, deflect, redirect, or dissipate crash energy. Thus, continued deformation of the door panels 100 is more likely to reach the position of a passenger within the vehicle, possibly resulting in serious injury.

However, with the catch tab 150 projecting through the aperture 330 of the forward bracket 130, the catch tab 150 is able to provide some retention for the forward bracket 130, and thus help retain the door impact protection beam 110 in place for longer during the crash event. In the example shown in FIG. 6, the catch tab 150 is bending as a result of the crash force 600 causing deflection of the door impact protection beam 110, and therefore of the forward bracket 130 and the aperture 330. If the forces on the catch tab are small enough or persist for a short enough time during the crash event, the catch tab 150 will retain the forward bracket 130 in its desired position, and thus preserve the ability of the door impact protection beam to absorb, deflect, redirect, or dissipate crash energy throughout the side impact crash event.

Conversely, if the forces on the catch tab 150 are great enough or persist for a long enough time during the crash event, the forward bracket 130 may slip off of the catch tab 150, or else the catch tab body 410 may break, tear, or detach from the door panel. In these cases, the catch tab 150 will no longer be able to restrain the forward bracket 130 from moving freely between the door panels 100, and thus the ability of the door impact protection beam 110 to absorb, deflect, redirect, or dissipate crash energy will still be compromised. However, even in these cases, the catch tab 150 will retain the forward bracket for a period of time during the crash event, and thus the door impact protection beam 110, will remain in the desired position for a longer period of time during the crash event, and will thus be capable of absorbing, deflecting, redirecting, or dissipating a larger overall amount of crash energy during the crash event. This may result in less risk of injury to a passenger within the vehicle.

Figure 7:
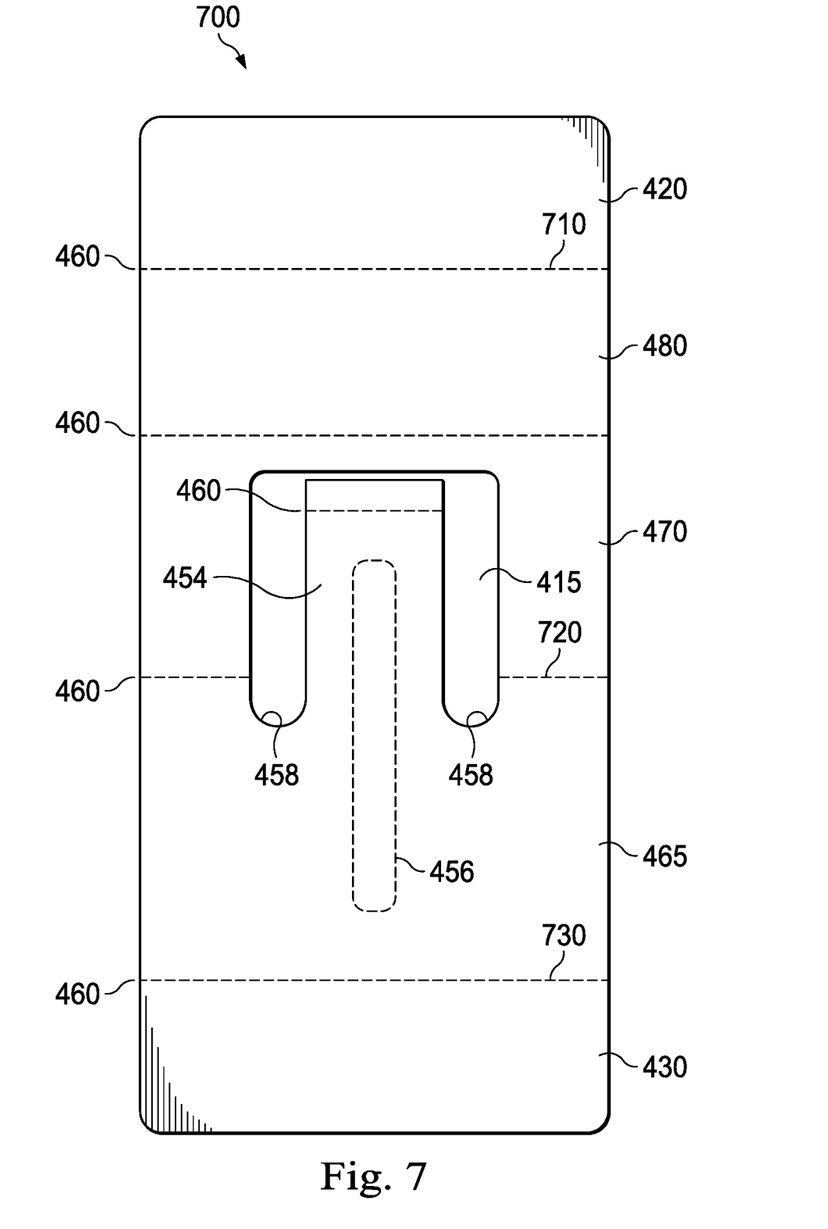
FIG. 7 is a diagrammatic view of an example sheet metal blank that can be stamped into an impact protection beam catch tab, in accordance with at least one embodiment of the present invention.

FIG. 7 is a diagrammatic view of an exemplary sheet metal blank 700 that can be stamped into an impact protection beam catch tab, in accordance with at least one embodiment of the present invention. In one example, the blank 700 is stamped in a two-step process. The first stamping step produces the opening 415, slots or notches 458, and stiffening bead 456. This step is performed to define the mast 454, which will remain straight or flat while the bends 460 are formed. A person of ordinary skill in the art will appreciate that although the opening 415 and slots or notches 458 advantageously reduce the weight of the impact protection beam catch tab, these features exist primarily to define the mast 454, and thus could be substantially smaller or larger than the example shown in FIG. 7. In other embodiments, the opening 415, slots or notches 458 may be defined in a cutting step rather than a stamping step. The second stamping step produces the folds 460 that form the forward coupling shoulder 420, secondary face 480, shelf 470, hook end 452, primary face 465 (including the mast 454 of the catch tab 150), and rear coupling shoulder 430. In a different example, all of these features are stamped into the blank in a single operation.

In the example shown in FIG. 7, the blank 700, opening 415, and slots or notches 458 are depicted with rounded corners. However, it should be understood that the stamping operation may also produce sharp, trimmed, or chamfered corners. After stamping, fold line 710 becomes the "top" edge of the secondary face 480 (as defined by the exemplary orientation of FIG. 4, which may not reflect the orientation of the impact protection beam catch tab when installed in a vehicle). Fold line 720 becomes the "top" edge of the primary face 465, and fold line 730 becomes the "bottom" edge of the primary face 465.

Depending on the implementation, the impact protection beam catch tab, can have a plurality of different shapes that fulfill the purposes described herein. The catch tab can be longer, shorter, wider, narrower, thicker, thinner, or taller, can have a different number of bends or degree of bending, or can have more or fewer tabs, hooks, apertures, attachment points, stiffening beads, or other related features as would occur to one of ordinary skill in the art to which this disclosure pertains. As will be readily appreciated by those having ordinary skill in the art after becoming familiar with the teachings herein, such variations do not depart from the spirit of the present disclosure. Accordingly, it can be seen that the impact protection beam catch tab advantageously increases the ability of a door impact protection beam to absorb, deflect, redirect, or dissipate crash energy in a side impact crash event, and may thus reduce the risk of injury to passengers within the vehicle.

A number of other variations are possible on the examples and embodiments described above. For example, the impact protection beam catch tab can be formed as a single piece, or can be formed by joining multiple pieces together. It can be made from a variety of different materials, including metals, polymers, ceramics, composites, carbon fiber, or other forms or allotropes of carbon. In some implementations, the impact protection beam and impact protection beam catch tab may be external to the vehicle door rather than internal to it. In some embodiments, the mast is part of (and therefore parallel to) the primary face. In other embodiments, the mast may project from the primary face at an angle of between 10 degrees and 90 degrees. In additional embodiments, the mast projects from the primary face at an angle of between 15 degrees and 30 degrees. The technology described herein may be employed in vehicles of various types, including cars, trucks, all-terrain vehicles, armored vehicles, watercraft, and aircraft. The logical components making up the embodiments of the technology described herein are referred to variously as operations, steps, objects, elements, components, or modules. Furthermore, it should be understood that these may occur or be positioned or performed in any order, unless explicitly claimed otherwise or a specific order is inherently necessitated by the claim language.

All directional references e.g., upper, lower, inner, outer, upward, downward, left, right, lateral, front, back, top, bottom, above, below, vertical, horizontal, lateral, longitudinal, clockwise, counterclockwise, proximal, and distal are only used for identification purposes to aid the reader's understanding of the claimed subject matter, and do not create limitations, particularly as to the position, orientation, or use of the impact protection beam catch tab. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." Unless otherwise noted in the claims, stated values shall be interpreted as illustrative only and shall not be taken to be limiting.

The above specification, examples and data provide a complete description of the structure and use of exemplary embodiments of the impact protection beam catch tab as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A retention device for an automotive door impact protection beam, comprising:
    a longitudinal primary face that includes a longitudinally extending mast comprising a stiffening bead and a hook end, the mast having a width and a length;
    a first coupling shoulder projecting laterally from a bottom edge of the primary face;
    a shelf projecting laterally from a top edge of the primary face, the shelf comprising an opening, the opening having a width sized greater than or equal to the width of the mast and a length sized greater than or equal to the length of the mast;
    a longitudinal secondary face projecting from an edge of the shelf; and
    a second coupling shoulder projecting laterally from a top edge of the secondary face.

2. The retention device of claim 1, further comprising two slots or notches in the top edge of the primary face, to the left and right of the mast respectively.

3. The retention device of claim 1, wherein the mast and hook end are positioned through an aperture of a bracket, wherein the bracket is coupled to a door panel of a vehicle.

4. The retention device of claim 3, wherein the bracket is coupled to an impact protection beam positioned adjacent to the door panel of the vehicle.

5. The retention device of claim 4, further comprising the bracket and the impact protection beam.

6. The retention device of claim 1, wherein the hook end projects from the mast at an angle of between 10 degrees and 90 degrees.

7. The retention device of claim 1, wherein the mast projects from and is parallel to the longitudinal primary face.

8. The retention device of claim 1, wherein:
    the hook end projects from the longitudinal primary face at an angle of about 45 degrees,
    the first coupling shoulder projects laterally from the bottom edge of the primary face at an angle of about 90 degrees,
    the shelf projecting laterally from a top edge of the primary face at an angle of about 90 degrees,
    the longitudinal secondary face projecting from the edge of the shelf at an angle of about 90 degrees,
    and the second coupling shoulder projects laterally from the top edge of the secondary face at an angle of about 90 degrees.

9. The retention device of claim 1, wherein:
    a length of the first coupling shoulder and second coupling shoulder is between 0.5 cm and 2.5 cm,
    a length of the secondary face is between 1.0 cm and 3.0 cm,
    a length of the shelf is between 2.0 cm and 4.0 cm,
    the length of the mast is between 2.0 cm and 4.0 cm,
    a length of the hook end is between 0.4 cm and 1.0 cm, and
    a length of the primary face is between 2.0 cm and 5.0 cm.

10. A retention system for an automotive door impact protection beam, comprising:
    a bracket coupled to a door panel of a vehicle, the bracket comprising an aperture;
    an impact protection beam coupled to the bracket and positioned adjacent to the door panel of the vehicle;
    a longitudinal primary face that includes a longitudinally extending mast comprising a stiffening bead and a hook end, the mast having a width and a length, wherein the mast extends through the aperture of the bracket;
    a first coupling shoulder coupled to the door panel and projecting laterally from a bottom edge of the primary face;
    a shelf projecting laterally from a top edge of the primary face, the shelf comprising an opening, the opening having a width sized greater than or equal to the width of the mast and a length sized greater than or equal to the length of the mast;
    a longitudinal secondary face projecting from an edge of the shelf; and
    a second coupling shoulder coupled to the door panel and projecting laterally from a top edge of the secondary face.

11. The retention system of claim 10, further comprising two slots or notches in the top edge of the primary face to the left and right of the mast.

12. The retention system of claim 10, wherein the hook end projects from the mast at an angle of between 10 degrees and 90 degrees.

13. The retention system of claim 10, wherein the mast projects from and is parallel to the longitudinal primary face.

14. The retention system of claim 10, wherein:
    the hook end projects from the longitudinal primary face at an angle of about 45 degrees,
    the first coupling shoulder projects laterally from the bottom edge of the primary face at an angle of about 90 degrees,
    the shelf projecting laterally from a top edge of the primary face at an angle of about 90 degrees, the longitudinal secondary face projecting from the edge of the shelf at an angle of about 90 degrees, and the second coupling shoulder projects laterally from the top edge of the secondary face at an angle of about 90 degrees.

15. The retention system of claim 10, wherein:

a length of the first coupling shoulder and second coupling shoulder is between 0.5 cm and 2.5 cm, a length of the secondary face is between 1.0 cm and 3.0 cm, a length of the shelf is between 2.0 cm and 4.0 cm, the length of the mast is between 1.0 cm and 4.0 cm, a length of the hook end is between 0.4 cm and 1.0 cm, and a length of the primary face is between 2.0 cm and 5.0 cm.

16. A method for retaining an impact protection beam within a vehicle door, the method comprising:

positioning the impact protection beam adjacent to a door panel of the vehicle door;

coupling the impact protection beam to a bracket, the bracket including an aperture;

coupling the bracket to the door panel of the vehicle door;

providing an impact protection beam catch tab having both a catch tab body and a catch tab mast, the catch tab mast comprising a hook end;

positioning the hook end and a portion of the catch tab mast through the aperture of the bracket; and coupling the catch tab body to the door panel of the vehicle door.

17. The method of claim 16, wherein the portion of the catch tab mast projecting through the aperture has a length of between about 1.0 centimeters and about 4.0 centimeters.

18. The method of claim 16, wherein a length of the hook end is between 0.4 cm and 1.0 cm.

19. The method of claim 16, wherein the hook end projects from the catch tab mast at an angle of between 10 degrees and 90 degrees.

* * * * *